L. HARLOW.
SAFETY COLLAR.
APPLICATION FILED JUNE 11, 1908.
904,530.
Patented Nov. 24, 1908.
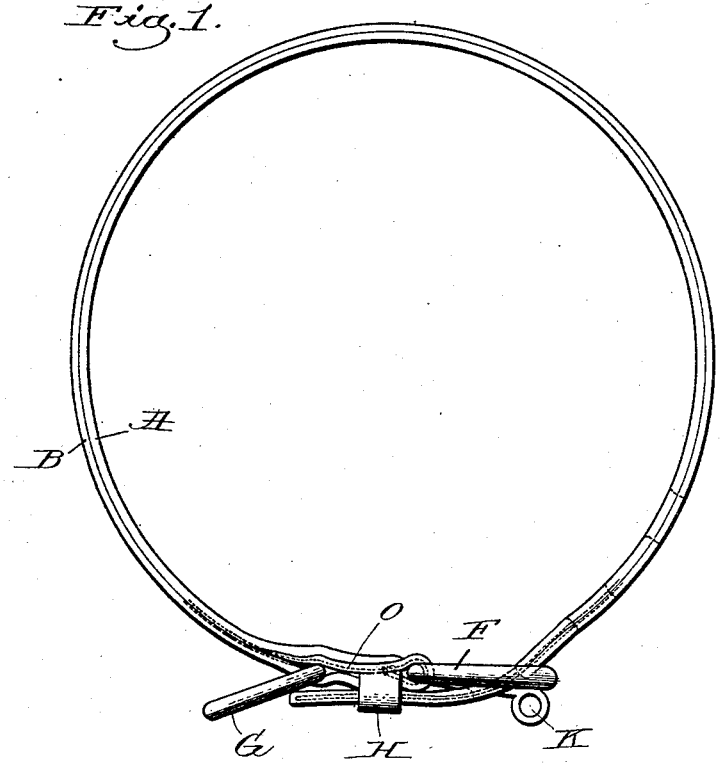
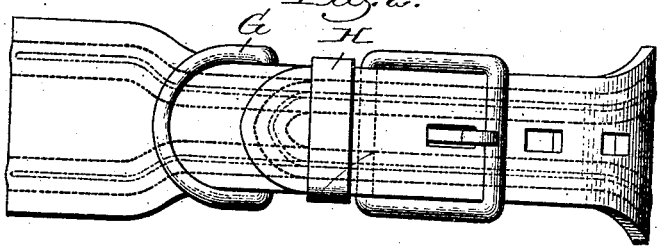
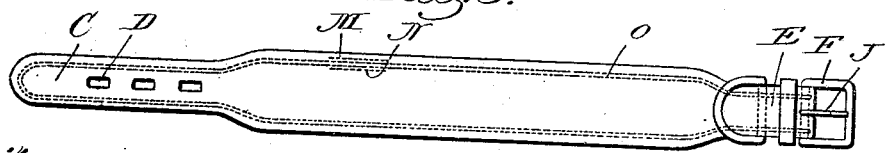

UNITED STATES PATENT OFFICE.

LOUIS HARLOW, OF EAST MILTON, MASSACHUSETTS, ASSIGNOR TO ERNEST P. LIBBY AND LOUIS HARLOW, OF BOSTON, MASSACHUSETTS, A COPARTNERSHIP.

SAFETY-COLLAR.

No. 904,530.   Specification of Letters Patent.   Patented Nov. 24, 1908.

Application filed June 11, 1908.   Serial No. 437,931.

*To all whom it may concern:*

Be it known that I, LOUIS HARLOW, a citizen of the United States, residing at East Milton, in the county of Norfolk and State of Massachusetts, have invented an Improvement in Safety-Collars, of which the following description, in connection with the accompanying drawing, is a specification, like letters on the drawing representing like parts.

This invention relates to a collar designed particularly for dogs, but capable of being used for other animals.

The object of the invention is to provide a device of this character which shall be of such strength as to prevent it from being broken or pulled off from the neck of the dog, and also one which shall serve to a large degree as a protection against thievery, and one in which the element by which strength and protection is secured shall be concealed.

The invention involves a continuous, flexible, metallic element which, when the collar is in place, forms a complete circle and is concealed between the plies of material of which the collar is made.

This element adds materially to the strength of the collar, preventing the dog from breaking loose from the collar, or removing it from its neck. At the same time it serves to prevent a person desiring to steal either the dog or the collar from removing the collar from the neck of the dog without the use of special tools.

The invention will appear more fully from the accompanying description and drawings and will be particularly pointed out in the claims.

The drawings represent a dog collar of a simple form of construction designed to be made of leather, and embodying this invention.

In the drawings, Figure 1 is a plan view of the collar as it appears when in position. Fig. 2 is a side elevation of the collar looking toward the point where the ends are connected. Fig. 3 is a side elevation of the entire collar shown as straightened out.

The collar itself may be of any suitable material, such as is employed in collars of this description, but is preferably made of stout leather in two plies stitched together. The shape and design of the collar are not involved in the invention.

As herein shown the collar is made of two plies or layers of material A and B, which are narrowed at their ends to form the tip portion C provided with the usual holes D, and the end portion E to which the buckle frame F is attached. These plies may be fastened together in any suitable manner as by stitching throughout the length thereof.

A common form of tie ring G is shown near the buckle end and a common form of retainer for the end of the collar is shown at H.

The buckle shown is of an ordinary form comprising the frame F and a tongue J, provided at its forward end with a ring K, adapted to receive a padlock by which the collar may be locked after being buckled.

A loop-shaped pocket is formed between the plies of the collar by two rows of stitching M, N, and this pocket has its ends at the frame of the buckle and extends around the tip end of the collar C in one continuous loop. In this pocket is placed a flexible metallic element herein shown as a piece of tough wire O. The ends of the wire O are secured to the frame F of the buckle and the wire extends in one continuous strand throughout the length of the looped pocket formed by the stitching M, N. Any suitable kind of wire or similar flexible metallic element may be used for the purpose. The wire, therefore, when the collar is in place forms a continuous circle because when the tip end of the collar is passed through the buckle and fastened in place the wire will overlap. The wire is, therefore, shown as extending in two strands throughout the circle of the collar, but any desired plurality of strands may be used and the wire may be held in place in the collar in any suitable manner.

It will be seeen that the wire lying between the plies of the collar is concealed from view and the collar presents the appearance of the ordinary collar. This wire adds very materially to the strength of the collar, preventing it being removed by the animal from its neck. Any one attempting for wrongful purposes to remove the collar from the neck of the animal will find it impracticable to cut the collar by means of any ordinary knife, and can only remove it by the use of cutting pliers or some similar tool. The collar thus strengthened and protected in accordance with this invention will thus serve to prevent the theft of the dog or of the collar.

In the claims where the term "wire" is used it is to be understood as comprising not only a single strand of wire but any compound wire or other flexible metallic element suitable for the purpose.

Having described my invention, what I claim as new and desire to secure by Letters Patent, is:

1. A collar comprising a plurality of plies of suitable material, a buckle attached to said plies, a wire secured at both its ends to the buckle frame and extending in a continuous loop the length of the collar and around the tongue holes therein.

2. A collar comprising a plurality of plies of suitable material, a buckle attached thereto, a loop-shaped pocket formed therebetween with its open end at the buckle and its closed end at the tip end of the collar, and a wire inclosed in said pocket and secured to the buckle frame.

3. A collar comprising two plies of leather, a buckle attached at one end thereto, two rows of stitching extending from the buckle along one edge of the collar, around the tip end, along the other edge, and back to the buckle, and forming therebetween and between the plies a loop-shaped pocket, a wire in said pocket extending there through and having its ends secured to the buckle frame.

In testimony whereof, I have signed my name to this specification, in the presence of two subscribing witnesses.

LOUIS HARLOW.

Witnesses:

MABEL PARTELOW,
THOMAS J. DRUMMOND.